(12) United States Patent
Speggiorin

(10) Patent No.: US 11,421,818 B2
(45) Date of Patent: Aug. 23, 2022

(54) BLOCKING DEVICE FOR SHAFTS AND A TRIPOD COMPRISING SAID BLOCKING DEVICE

(71) Applicant: VITEC IMAGING SOLUTIONS S.P.A., Cassola (IT)

(72) Inventor: Paolo Speggiorin, Mussolente (IT)

(73) Assignee: VITEC IMAGING SOLUTIONS S.P.A., Cassola (IT)

( * ) Notice: Subject to any disclaimer, the term of this patent is extended or adjusted under 35 U.S.C. 154(b) by 0 days.

(21) Appl. No.: 17/262,035

(22) PCT Filed: Jul. 18, 2019

(86) PCT No.: PCT/IB2019/056166
§ 371 (c)(1),
(2) Date: Jan. 21, 2021

(87) PCT Pub. No.: WO2020/021410
PCT Pub. Date: Jan. 30, 2020

(65) Prior Publication Data
US 2021/0254783 A1     Aug. 19, 2021

(30) Foreign Application Priority Data
Jul. 26, 2018   (IT) .................. 102018000007528

(51) Int. Cl.
*F16M 11/24*    (2006.01)
*G03B 17/56*    (2021.01)

(52) U.S. Cl.
CPC ......... *F16M 11/242* (2013.01); *G03B 17/561* (2013.01)

(58) Field of Classification Search
CPC ............... G03B 17/561; F16M 11/242; F16M 2200/027; F16B 2/185; F16B 7/0433
See application file for complete search history.

(56) References Cited

U.S. PATENT DOCUMENTS 821,335 A * 5/1906 Butler .................... F16M 11/16
                                                          248/168
6,082,685 A   7/2000 Hein et al.

FOREIGN PATENT DOCUMENTS

| CN | 201107535 Y | 8/2008 | |
| CN | 102619831 A | 8/2012 | |
| DE | 2640610 A * | 3/1978 | ............ F16B 7/1454 |
| DE | 3805260 A1 | 8/1989 | |
| DE | 102008045183 B3 | 2/2010 | |
| EP | 0533376 A1 * | 3/1993 | ............. F16M 11/36 |
| EP | 2166270 A2 | 3/2010 | |

* cited by examiner

*Primary Examiner* — Christopher E Mahoney
(74) *Attorney, Agent, or Firm* — Volpe Koenig

(57) ABSTRACT

A blocking device for shafts includes a housing having a first seat for receiving a shaft movable along a first sliding axis, an actuator received in a second seat formed in the housing and movable along a second sliding axis away from and towards a blocking position of the shaft, and at least one runner which is received in the housing and which is interposed between the actuator and the shaft. The actuator is formed such that, when it is moved towards the blocking position, it urges the one runner both against the shaft and against the housing so as to block the actuator, the runner and the shaft with respect to the housing.

8 Claims, 15 Drawing Sheets

BLOCKING DEVICE FOR SHAFTS AND A TRIPOD COMPRISING SAID BLOCKING DEVICE

TECHNICAL FIELD

The present invention relates to a blocking device for shafts, in particular a blocking device used in a support tripod in the field of photography.

TECHNOLOGICAL BACKGROUND

It is known in the field of photography to use devices for supporting the video-photographic equipment, including tripods and monopods which are found to be particularly widespread and appreciated both at an amateur and at a professional level. These devices typically comprise one or more legs, each one composed of different sectors or shafts which can slide relative to each other so as to allow the leg to be able to be extended so as to be able to advantageously support the video-photographic equipment in an operating position and then to be retracted in order to reduce the overall dimensions thereof and to allow convenient transport and storage of the device itself.

During a video-photographic shooting, in a specific manner a shooting of professional quality, it is particularly important to be able to have a support device, typically a tripod, which is subjected as little as possible to movements which are generated by torsional forces which act on the legs. This condition can readily be generated during the various movements or adjustments of the video-photographic equipment which can also occur during the shooting.

In order to seek to solve or minimize this problem, there have been carried out different technical solutions, some directed towards increasing the thickness of the shafts or increasing the rigidity thereof (for example, using materials having high moduli of elasticity, such as, for example, composites comprising carbon fibres) or by producing pairs of parallel legs which are secured to each other. Regarding this last mentioned technical solution, it is known to produce support devices, the shafts of each leg of which are blocked in a desired position by a blocking device comprising a runner which can slide inside a housing and which is movable towards a shaft so as to abut it, applying thereto a pressure in a radial direction with respect to the shaft itself, so as to block it with respect to the housing.

However, the Applicant has found that the torsional stability of these support devices is not completely satisfactory.

In particular, the Applicant has observed that the blocking device described above does not allow elimination or even a significant reduction of the play present between the shaft, runner and housing, thereby being unsuitable for reducing the undesirable movements of the tripod following an application of torsional forces.

DISCLOSURE OF THE INVENTION

The problem addressed by the present invention is to provide a blocking device for shafts and a tripod comprising such a blocking device which is structurally and functionally configured to at least partially overcome one of the limitations set out above with reference to the cited prior art.

In the context of this problem, it is also an object of the invention to provide a blocking device for shafts which is capable of counteracting any torsional forces applied, thereby obtaining a high level of rigidity and stability.

Another object of the invention is to provide a blocking device for shafts which is simple to construct and which allows the production of tripods with high levels of stability at low cost.

This problem is solved and these objects are achieved by the present invention by means of a blocking device for shafts which is realized according to the appended claims.

In a first aspect thereof, therefore, the present invention is directed towards a blocking device for shafts comprising a housing comprising a first seat, in which a shaft slides along a first sliding axis, an actuator which is received in a second seat which is formed in the housing and which can be moved along a second sliding axis away from and towards a blocking position of the shaft in the first seat, and at least one runner which is received in the housing and which is interposed between the actuator and the shaft.

The actuator is formed in such a manner that, when it is moved towards the blocking position, it urges the at least one runner both against the shaft and against the housing so as to block the actuator, the at least one runner and the shaft with respect to the housing.

As a result of this technical solution, the actuator, when it is moved towards the blocking position, presses on the shaft in accordance with a radial component of the shaft itself by means of the runner and, at the same time, secures, at least with respect to the direction of the third sliding axis, the shaft with respect to the runner and the housing.

This concerted mechanism for mutual securing between the above-mentioned elements results in the production of a device which, with respect to those present in the cited prior art, is generally more rigid, stable and which does not have any play between the actuator and the shaft.

In a second aspect thereof, the present invention is directed towards a tripod for supporting video-photographic equipment comprising a plurality of shafts which can be moved relative to each other between an extended configuration and a retracted configuration and at least one blocking device for blocking the shafts in a desired position, constructed according to the first aspect of the invention.

In at least one of the above-mentioned aspects, the present invention may have at least one of the following preferred features.

Preferably, the actuator can be moved along the second sliding axis between a free sliding position of the shaft, in which the actuator is at the maximum distance from the shaft, and the blocking position of the shaft, in which the actuator is at the minimum distance from the shaft.

According to an embodiment, the at least one runner is received in a third seat which is formed in the housing.

Preferably, the at least one runner is received in the housing with the capacity for movement along a third sliding axis.

Preferably, the actuator comprises at least a first inclined surface with respect to the second sliding axis.

Preferably, the at least one runner comprises a corresponding first abutment surface which is formed so as to be urged against the shaft and against the housing by the first inclined surface when the actuator is moved towards the blocking position.

In this manner, there is brought about a constraining transfer of force which is applied by the actuator to the shaft by means of the at least one runner, given that the first inclined surface urges the corresponding first abutment surface in accordance with a combination of directions having a component which is orientated radially with respect to the shaft (this contribution originates from the orientation of the second sliding axis) and a component which moves the at least one runner as far as abutment against the housing.

It is evident that the second sliding axis, defining two operating positions, one correlated with the maximum distance thereof from the shaft and one correlated with the minimum distance thereof from the shaft, cannot be parallel with the longitudinal axis of the shaft itself.

Preferably, the first surface of the actuator is inclined with respect to the second sliding axis and the third sliding axis.

The transfer previously described of constraining force applied by the actuator to the shaft by means of the at least one runner is thereby optimized, given that the first inclined surface urges the corresponding first abutment surface of the at least one runner in accordance with a combination of directions which are described in greater detail below.

This combination of directions provides for a component which is orientated radially with respect to the shaft (as previously described) and a component which is parallel with the third sliding axis which moves the at least one runner until it is secured to the housing.

Furthermore, the at least one runner can move in the direction of the third sliding axis and follow in a finer and more efficient manner the translational movements produced by the first inclined surface until it reaches abutment against or with respect to the housing.

Preferably, the first inclined surface is inclined with respect to any triplet of axes which are orthogonal to each other and of which one axis is parallel with the second sliding axis.

This technical solution further increases the securing which can be brought about between the actuator, the at least one runner, the shaft and the housing because it produces a combination of directions which comprises three directions, of which a first is orientated radially with respect to the axis of the shaft, a second is orientated parallel with the third sliding axis and a third is orientated in a direction perpendicular to the third sliding axis.

In this manner, this concerted mechanism between the actuator, the runner, the shaft and the housing, which allows them to be secured to each other in a rigid manner, is further increased.

Preferably, the blocking device comprises a first and a second runner which are received in the housing and which are formed so as to be moved away from each other when the actuator moves towards the blocking position.

As a result of this configuration, the securing which can be achieved between the actuator, the runner, the shaft and the housing is further optimized because now the first and the second runners move into abutment with each other and are blocked in opposite directions of the third sliding axis.

According to an embodiment, the third sliding axis is parallel with the longitudinal axis of the shaft.

As a result of this technical solution, this ensures that the securing actions produced by means of the at least one runner on the housing are precisely orientated in a direction parallel with the direction of the possible sliding of the housing with respect to the shaft, thereby optimizing the rigidity of the system.

Preferably, the actuator comprises at least one protrusion which is adjacent to the first inclined surface and which is formed so as to act as a guide along the third sliding axis for the at least one runner.

It is thereby also possible to improve the control of the mutual movements between the first inclined surface and the corresponding first abutment surface in directions transverse to the third sliding axis.

According to an embodiment, the actuator is moved along the second sliding axis by means of a rod which is connected to a cam lever.

As a result of this technical solution, it is possible for a user to effectively and practically move the actuator away from and towards the blocking position.

Preferably, the housing comprises a plurality of first seats in which there slides a plurality of shafts, on which the actuator can selectively act by means of the at least one runner.

It is thereby possible to ensure that for some shafts there is afforded the possibility of blocking while for others there is simply afforded the possibility of free sliding or constant constraint.

Alternatively, the housing comprises a plurality of first seats in which there slides a plurality of shafts, and at least one hole, in which an end of at least one other fixed shaft is secured.

Preferably, the actuator comprises a plurality of first seats in which there slides the plurality of shafts, a corresponding plurality of third seats, in which there slides at least one runner for each shaft of the plurality of shafts.

This solution allows distribution of the securing actions which it is desirable to produce in a more uniform, controlled and effective manner, minimizing the play which can be produced between the actuator and the plurality of shafts.

According to an embodiment of the present invention, there is provided a blocking system which comprises a plurality of blocking devices having at least one of the features set out above, wherein each blocking device of the plurality acts by unblocking or blocking at least one corresponding shaft.

As a result of this solution, it is possible to move in translation different shafts, thereby defining sliding sectors, each one having high levels of torsional rigidity which, in total, define the maximum and minimum length of the leg of the support for photographic/video equipment to which they are applied.

BRIEF DESCRIPTION OF THE DRAWINGS

The features and advantages of the invention will be better appreciated from the detailed description of some preferred embodiments thereof, which are illustrated by way of non-limiting example with reference to the appended drawings, in which.

PREFERRED EMBODIMENT OF THE INVENTION

Figure 1:
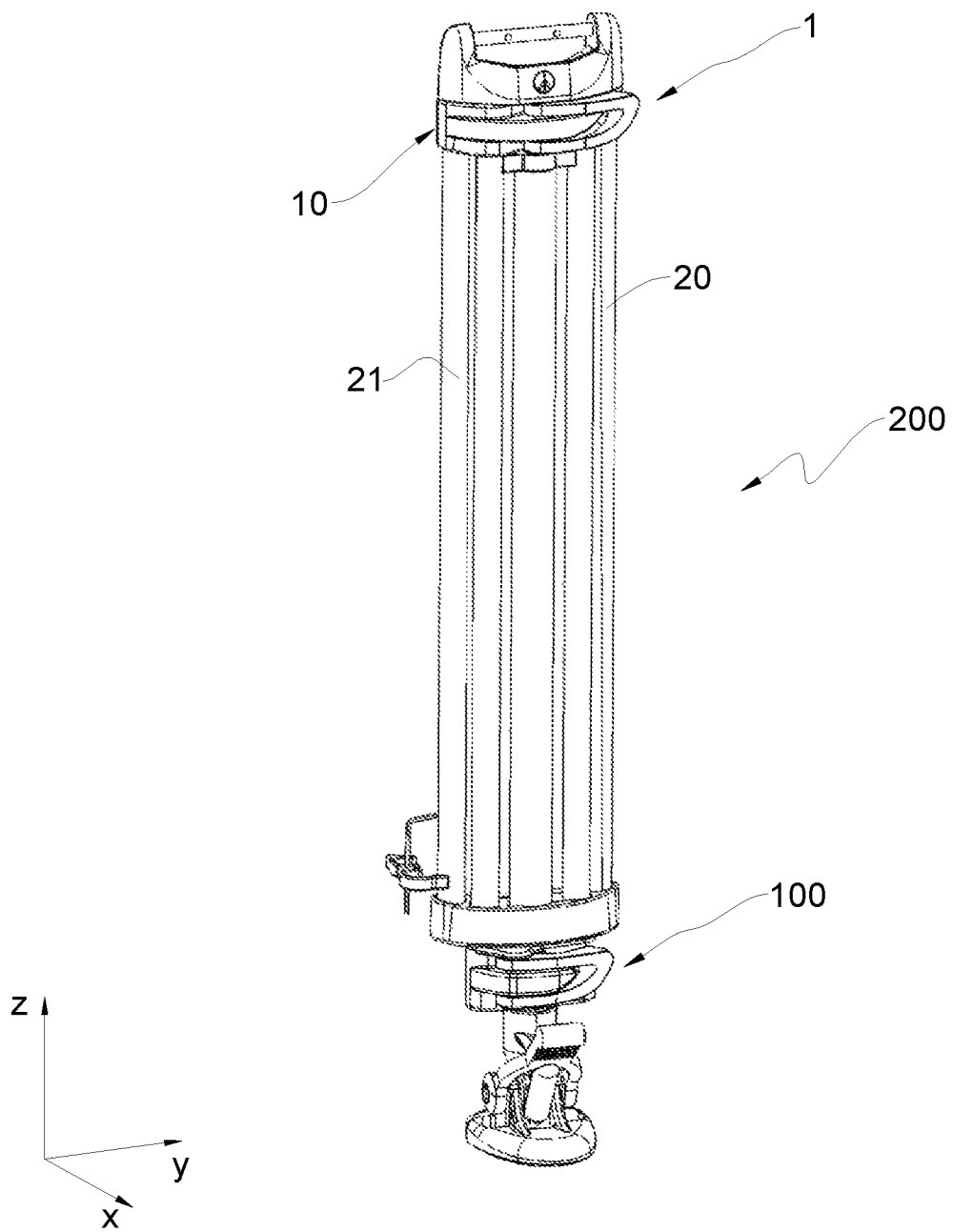
FIG. 1 is a schematic, perspective view of a device for supporting video-photographic equipment comprising a blocking system for shafts and two blocking devices for shafts which are realised according to the present invention.

FIG. 1 illustrates a support for video-photographic equipment comprising a blocking system 200 for shafts including two blocking devices 1 and 100 for shafts which are constructed according to the present invention.

In order to facilitate the understanding of the spatial arrangement of the support and components present therein, there is inserted in FIGS. 1, 2, 4, 6, 7, 11, 12 and 13 a three-axis Cartesian reference system X, Y, Z, in which the axis Z can be identified by the vertical direction with respect to a horizontal support plane, according to which the above-mentioned equipment support is normally positioned.

The support for video-photographic equipment is a leg of a tripod and comprises a plurality of rigid shafts 20, 21, 22, 23, 24, at the apex of which there is positioned a plate which is provided with an attachment element, for example, a ⅜" screw, which is provided to fix to the tripod a video-photographic equipment item which is conventional per se and which is not illustrated in the appended Figures.

Initially with reference to FIGS. 1 to 10, there is generally designated 1 a first embodiment of a blocking device for shafts which is constructed according to the present invention.

Preferably, the blocking device 1 for shafts comprises a housing 10 with respect to which shafts 20, 21 can slide in respective first seats 11a, 11b.

Figure 3:
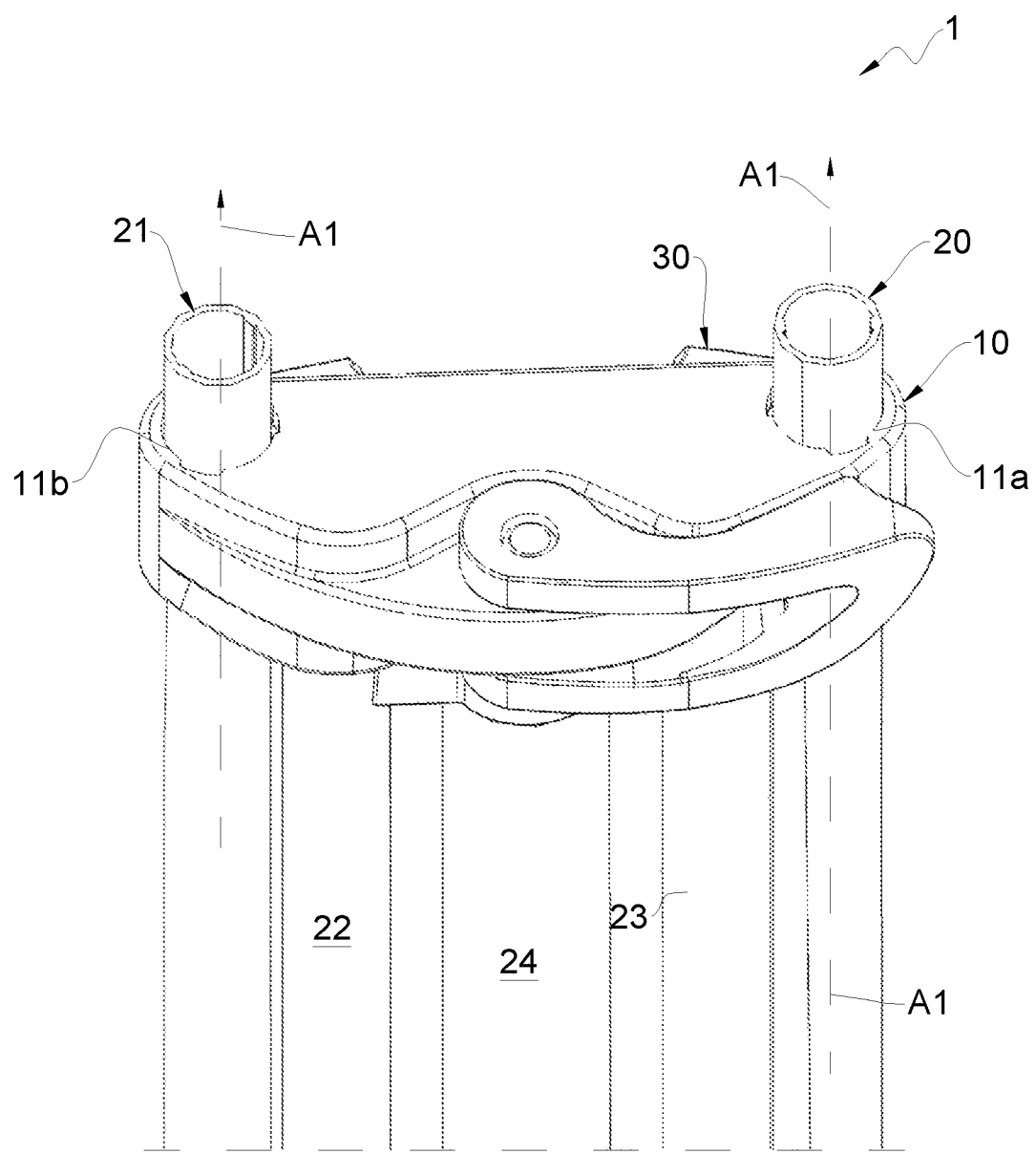
FIG. 3 is a schematic, perspective view of an enlarged portion of the support device of FIG. 1 without any support element, wherein an embodiment of the blocking device for shafts is illustrated.

According to an embodiment and with reference to FIG. 3, the housing 10 comprises a first seat 11a, in which the shaft 20 slides along a first sliding axis A1.

Figure 2:
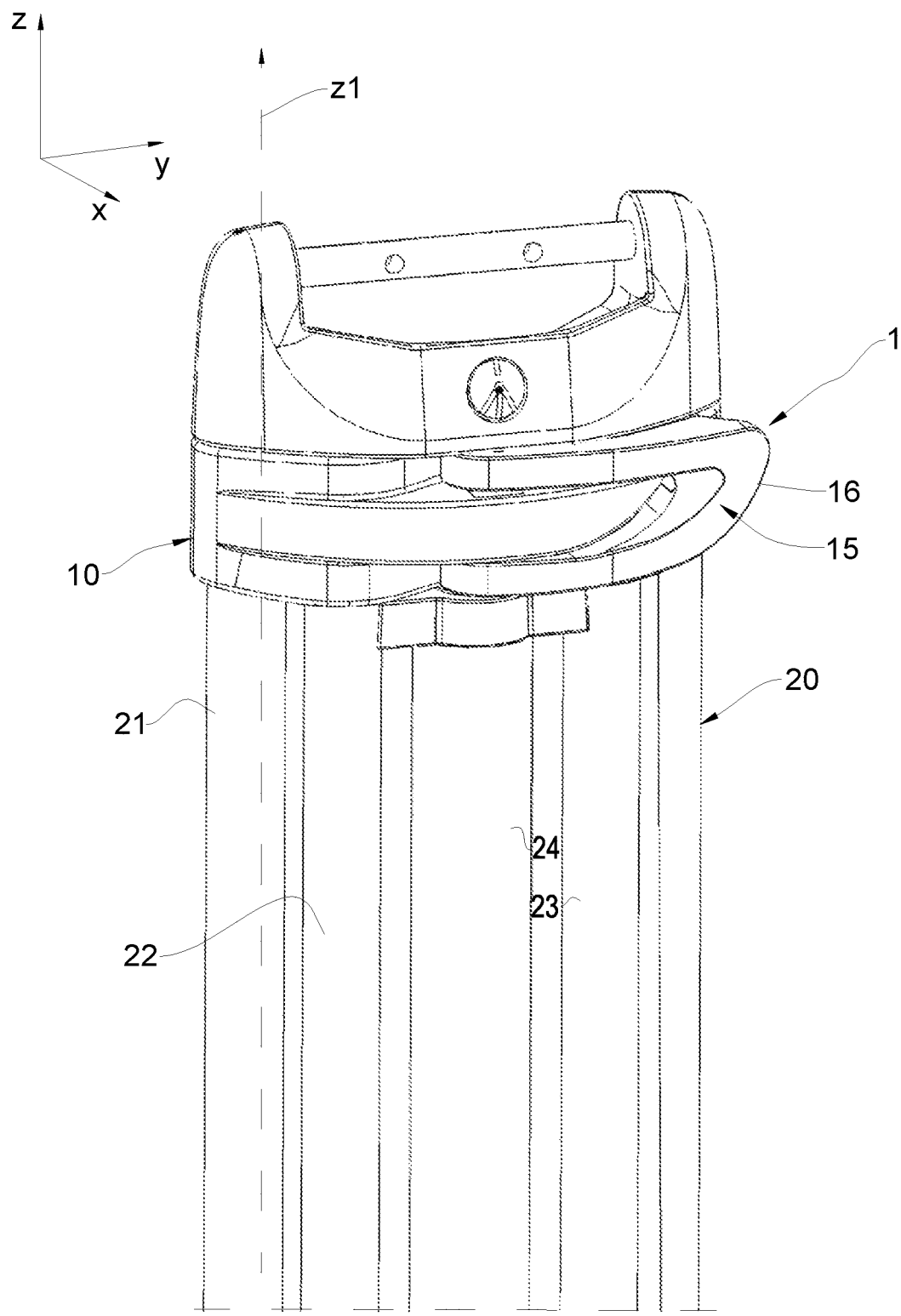
FIG. 2 is a schematic, perspective front partial view of a first embodiment of a support device of FIG. 1.

With reference to FIG. 2, this first sliding axis A1 is parallel with the longitudinal axis Z1 of the shafts 20, 21, 22, 23, 24 and the vertical axis Z of the three-axis Cartesian reference system X, Y, Z.

Figure 5:
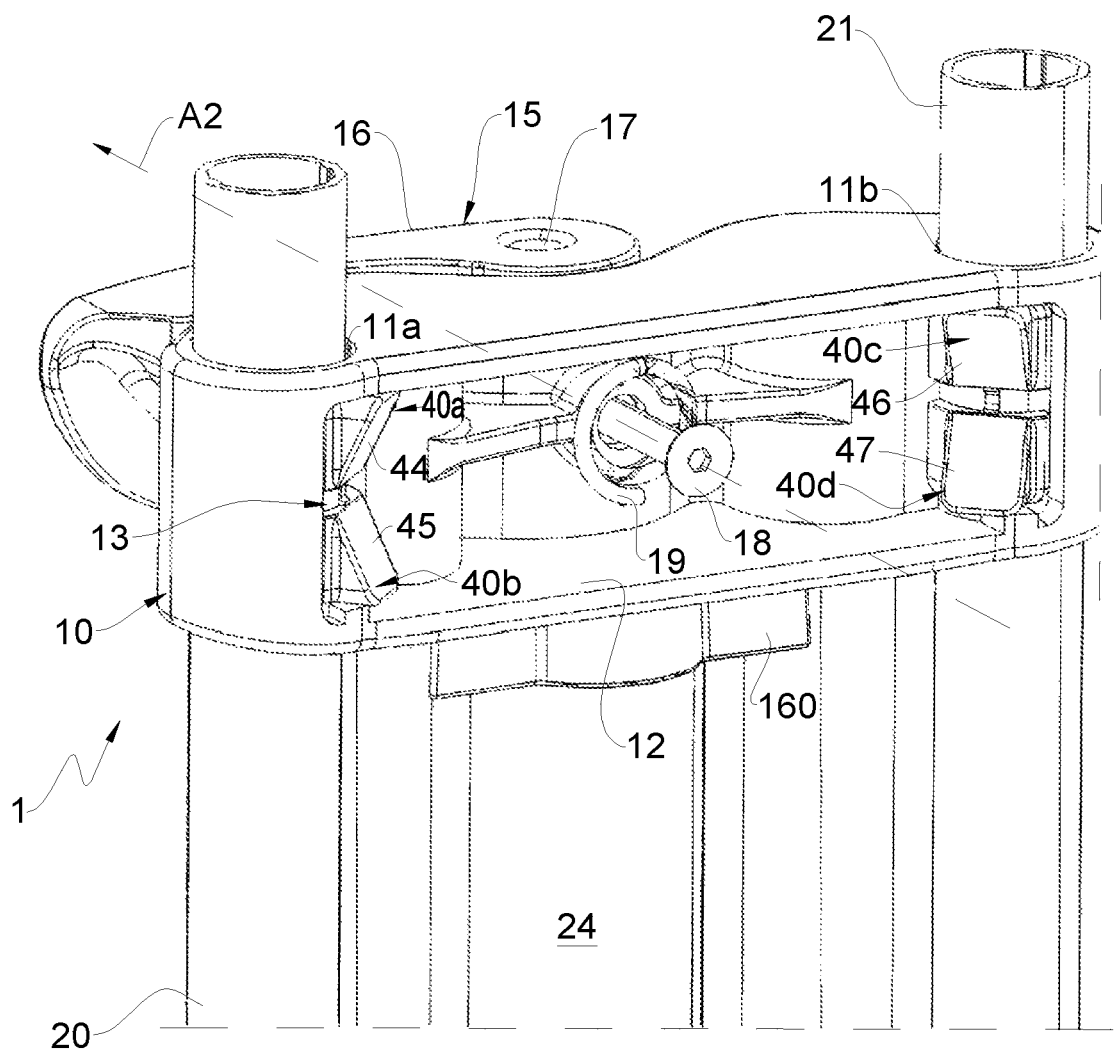
FIG. 5 is a schematic, perspective view of the support device of FIG. 4 without any actuator.

With reference to FIGS. 2 and 5, it may be noted that the embodiment shown provides for the two shafts 20, 21 to be able to slide in the first seats 11a, 11b with respect to the housing 10, while the shafts 22, 23 are secured in suitable recesses, thereby being fixedly joined to the housing 10. The central shaft 24 is not secured to the housing 10 but moves into abutment therewith when it reaches the travel limit stop.

The aspects of subject-matter which are set out below apply conversely to both the shafts 20 and 21. Preferably, the housing 10 comprises a second seat 12, in which an actuator 30 slides by being moved along a second sliding axis A2 from a sliding position, in which it is at the maximum distance from the shaft 20, to a blocking position C2, in which it is at the minimum distance from the shaft 20.

Figure 4:
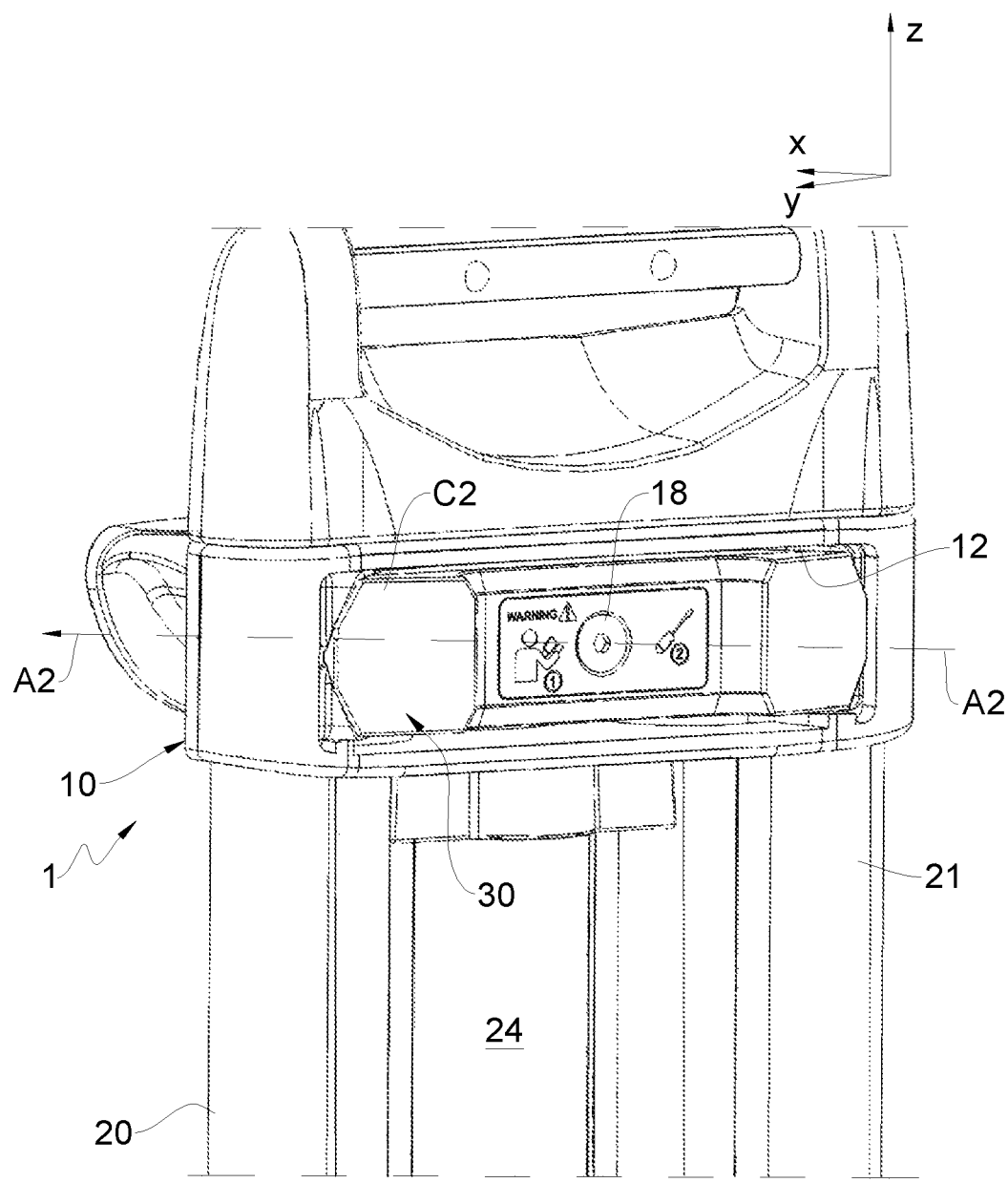
FIG. 4 is a schematic, perspective rear and partial view of the support device of FIG. 1.
Figure 6:
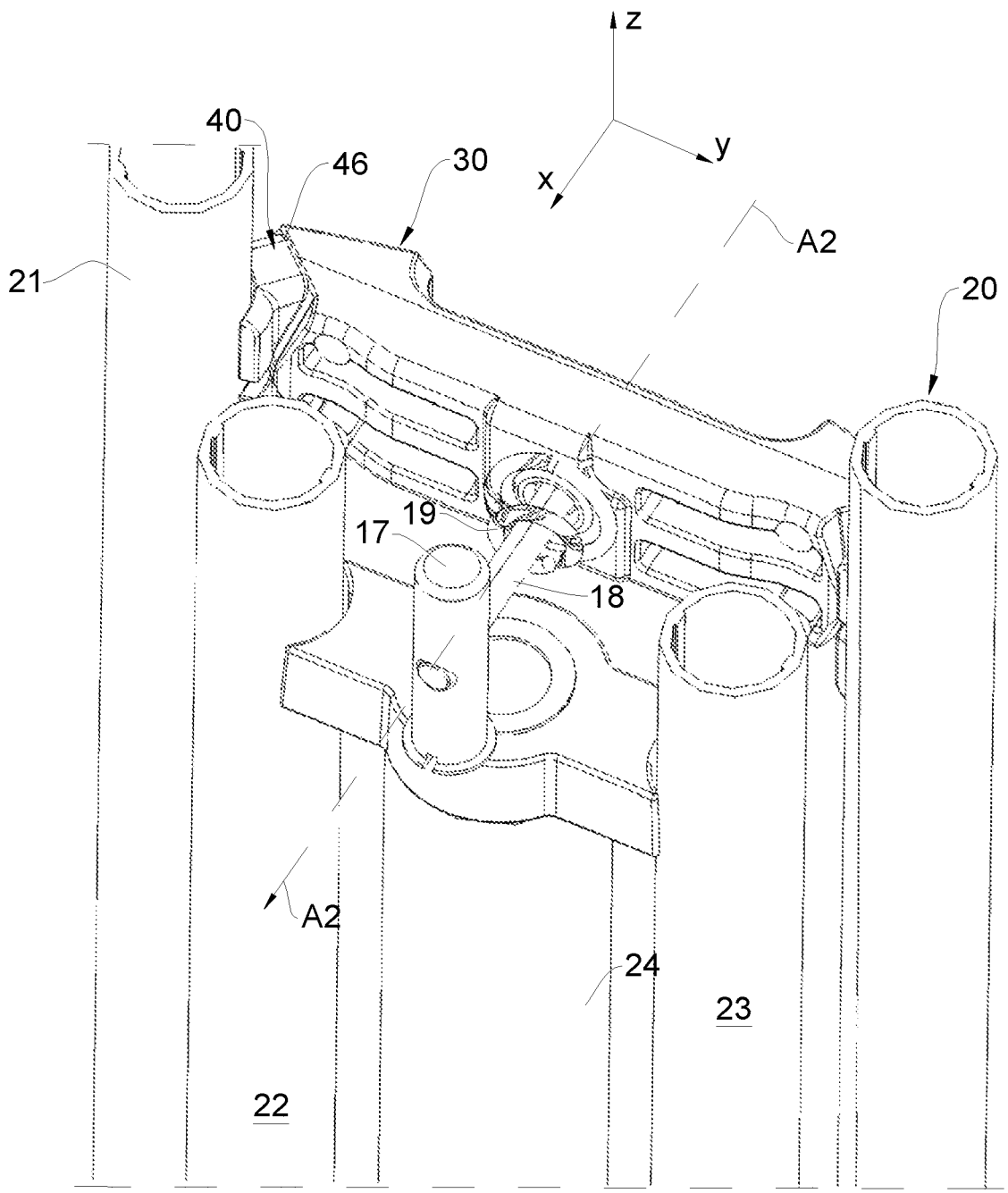
FIG. 6 is a perspective view of the device of FIG. 2, without the housing and a lever for a cam mechanism.

With reference to FIGS. 4 and 6, it can be seen how the second sliding axis A2 is parallel with the horizontal axis X of the three-axis Cartesian reference system X, Y, Z.

The blocking device 1 comprises an actuator 30 which acts on the shafts 20 and 21 blocking each of them by means of at least one corresponding runner 40a and 40c which is interposed between the actuator 30 and the shafts 20, 21 themselves, as better explained below.

The actuator 30 is advantageously connected to a movement mechanism 15 which, as shown in FIGS. 3, 5, 8 and 10, is readily usable by a user by means of a cam lever 16. In greater detail, FIGS. 4 and 5 show that the cam lever 16 has a pin 17 which is hinged and connected to a first end of a rod 18 which is secured at a second end thereof, opposite the first end, to the actuator 30. This movement mechanism 15 also comprises a resilient behaviour element, for example, a spring 19, which is interposed between the cam lever 16 and the actuator 30. Still with reference to FIG. 5, it is evident that, when the cam lever 16 is closed, moving the cam lever 16 to the minimum distance from the housing 10, the rotation of the eccentric of the lever 16 causes the pin 17 to move away from the housing 10 and, consequently, to move the actuator 30 along the second sliding axis A2 and towards the shafts 20 and 21.

When this occurs, the spring 19 is compressed by the movement of the actuator 30 and this resilient energy which is stored is released once the cam lever 16 rotates in the opposite direction, thereby promoting the movement of the actuator 30 away from the shafts 20, 21.

Preferably, with reference to FIGS. 5, 9, 10 and 13, the housing 10 comprises a third seat 13 in which at least one runner 40a slides, moving along a third sliding axis A3.

The actuator 30 is formed in such a manner that, when it moves towards the blocking position C2, it moves the at least one runner 40a against the shaft 20 and against the housing 10 in order to block the actuator 30, the at least one runner 40a and the shaft 20 with respect to the housing 10.

According to an embodiment, the actuator 30 comprises at least one first inclined surface 34 with respect to the second sliding axis A2 and the third sliding axis A3.

In the embodiments shown in the Figure, it may be noted how the third sliding axis A3 is preferably parallel with the axis Z.

Figure 7:
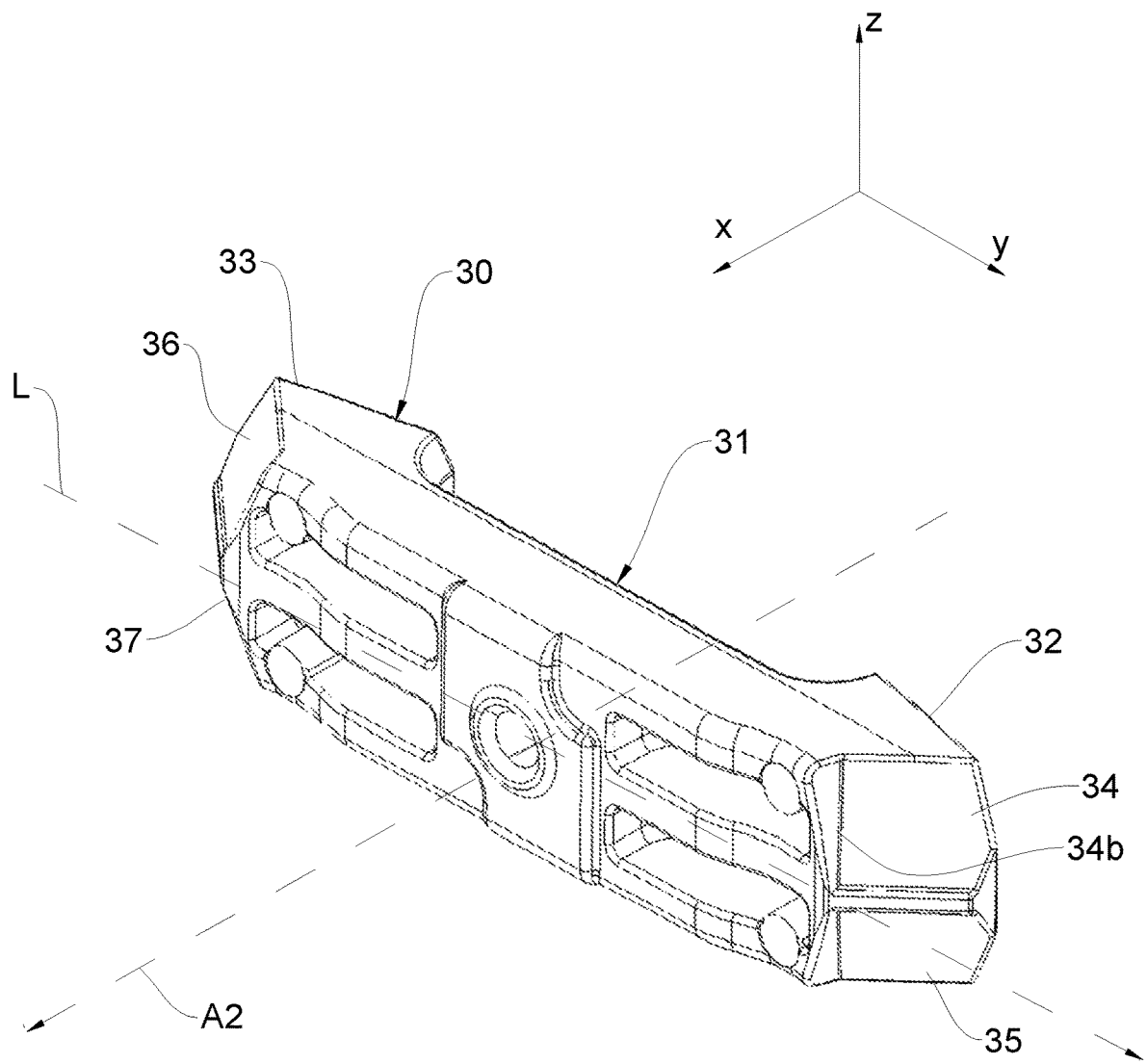
FIG. 7 is a schematic, perspective view only of the actuator of FIG. 6.

With reference to FIG. 7, the actuator 30 preferably has an elongate form in accordance with a main development axis L which is perpendicular to the second sliding axis A2 when it is inserted inside the housing 10. This main development axis L is parallel with the axis X of the three-axis Cartesian reference system X, Y, Z.

The actuator 30 comprises a main body 31 having a substantially parallelepipedal, elongate form on which there can be identified a first end and a second end 32, 33 which are opposite each other.

Furthermore, the actuator 30 comprises, in the region of the first end 32, the first inclined surface 34 and a second inclined surface 35 and, in the region of the second end 33, a third inclined surface 36 and a fourth inclined surface 37.

Still with reference to FIG. 7, the first inclined surface 34 and the second inclined surface 35 are incident and advantageously have an inclination which is symmetrical with respect to a transverse plane of symmetry which is defined by the second sliding axis A2 and by the main development axis L (that is to say, as defined by the axes X and Y of the three-axis Cartesian reference system X, Y, Z).

In other words, the first inclined surface 34 and the second inclined surface 35 correspond to the lateral surfaces of a wedge having the vertex directed towards the shaft 20 when the actuator is inserted inside the housing 10.

These features described for the first end 32 and respective first inclined surface 34 and second inclined surface 35 also apply to the second end 33 and the third inclined surface 36 and the fourth inclined surface 37.

Preferably, the at least one runner 40a comprises a corresponding first abutment surface 44 which is formed so as to be urged against the shaft 20 and against the housing 10 by the first inclined surface 34 when the actuator 30 moves towards the blocking position C2.

The first runner 40a has a curved basic surface which has a radius of curvature similar to the shaft 20 on which it get in contact. Therefore, there is produced a form-fitting connection between the basic surface of the first runner and the surface of the shaft.

An effective contact and capacity for sliding between the at least one runner 40a and the shaft on which it is supported is thereby ensured.

According to an embodiment, the first, second, third and fourth inclined surfaces 34, 35, 36 and 37 are preferably planar surfaces. Advantageously, with reference to FIGS. 5, 8, 9 and 10, it may be noted how the corresponding first, second, third and fourth abutment surfaces 44, 45, 46 and 47 are also planar surfaces. There are also provided additional alternative forms of the inclined surfaces and the corresponding abutment surfaces such as, for example, concave surfaces, convex surfaces or surfaces provided with specific ribbings which are capable of increasing and improving the mutual securing actions between the actuator 30 and the at least one runner 40a.

The above-mentioned inclined surfaces 34, 35, 36, 37 and the corresponding abutment surfaces 44, 45, 46, 47 are formed so as to produce a form-fitting connection when they are positioned in contact with each other. In other words, this formation allows the corresponding first, second, third and fourth abutment surfaces 44, 45, 46, 47 to be effectively complementary to the first, second, third and fourth inclined surfaces 34, 35, 36, 37 by sliding one on the other readily in accordance with the movement together or apart of the actuator 30 along the sliding axis A2.

Still with reference to FIG. 7, it may be noted how the first inclined surface 34 is preferably inclined with respect to any triplet of axes which are orthogonal to each other and of which one axis is parallel with the second sliding axis A2. In other words, the first inclined surface 34 and the second inclined surface 35 correspond to the lateral surfaces of the above-mentioned wedge having the vertex directed towards the shaft 20 when the actuator is inserted inside the housing 10 and this orientation direction of the vertex of the wedge with respect to the shaft 20 is transverse and not perpendicular to the development axis L (that is to say, it is transverse to and not parallel with the second sliding axis A2).

In this manner, the first inclined surface 34 and the second inclined surface 35, being lateral walls of the wedge, are not parallel with the transverse plane which is defined by the second sliding axis A2 and the development axis L and not even a projection thereof into the above-mentioned transverse plane (which can be identified by the plane XY of the three-axis Cartesian reference system X, Y, Z) is parallel with the second sliding axis A2 or the development axis L.

Figure 9:
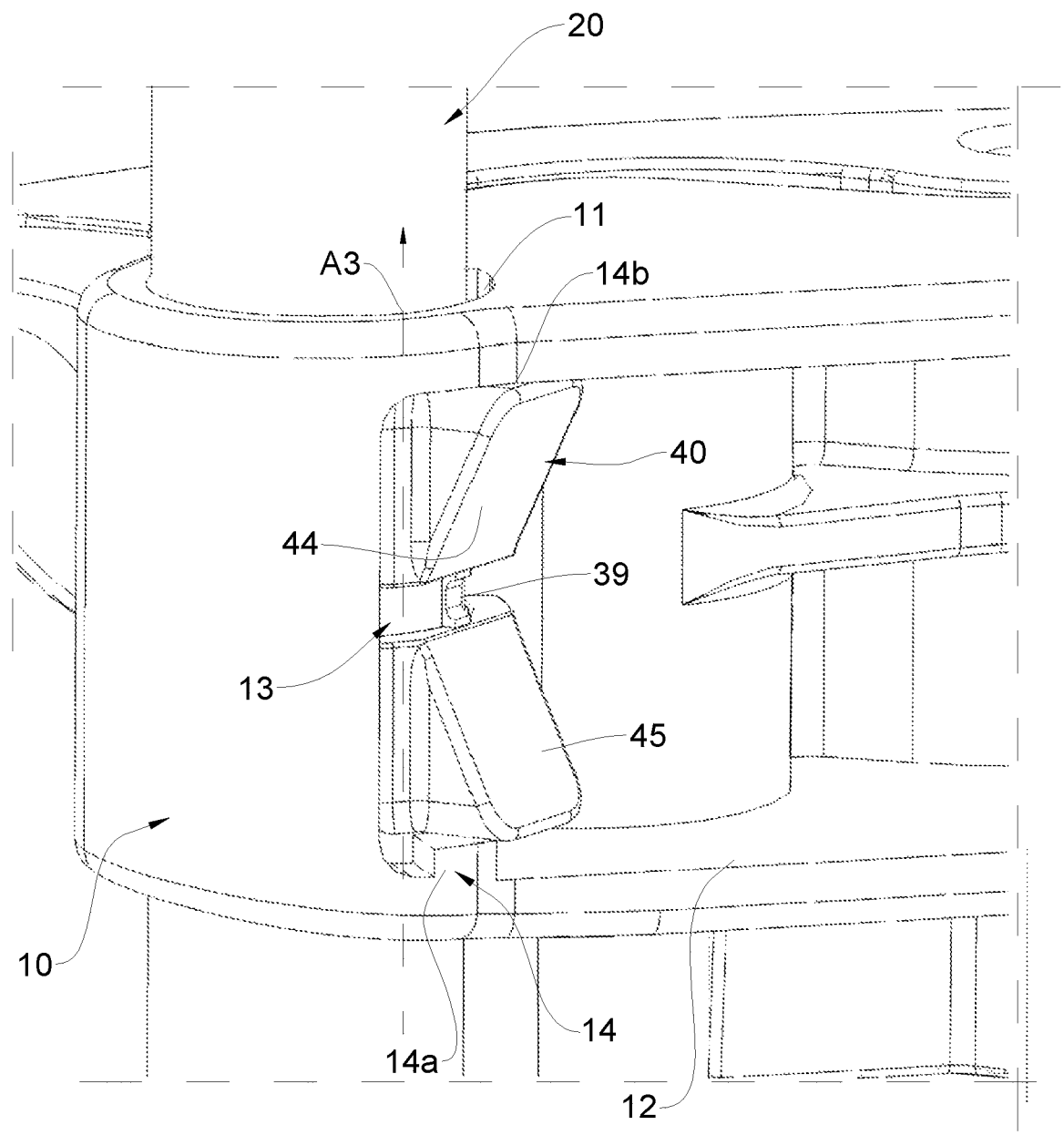
FIG. 9 is a schematic, perspective partial detailed view of a detail of the blocking device of FIG. 5.
Figure 10:
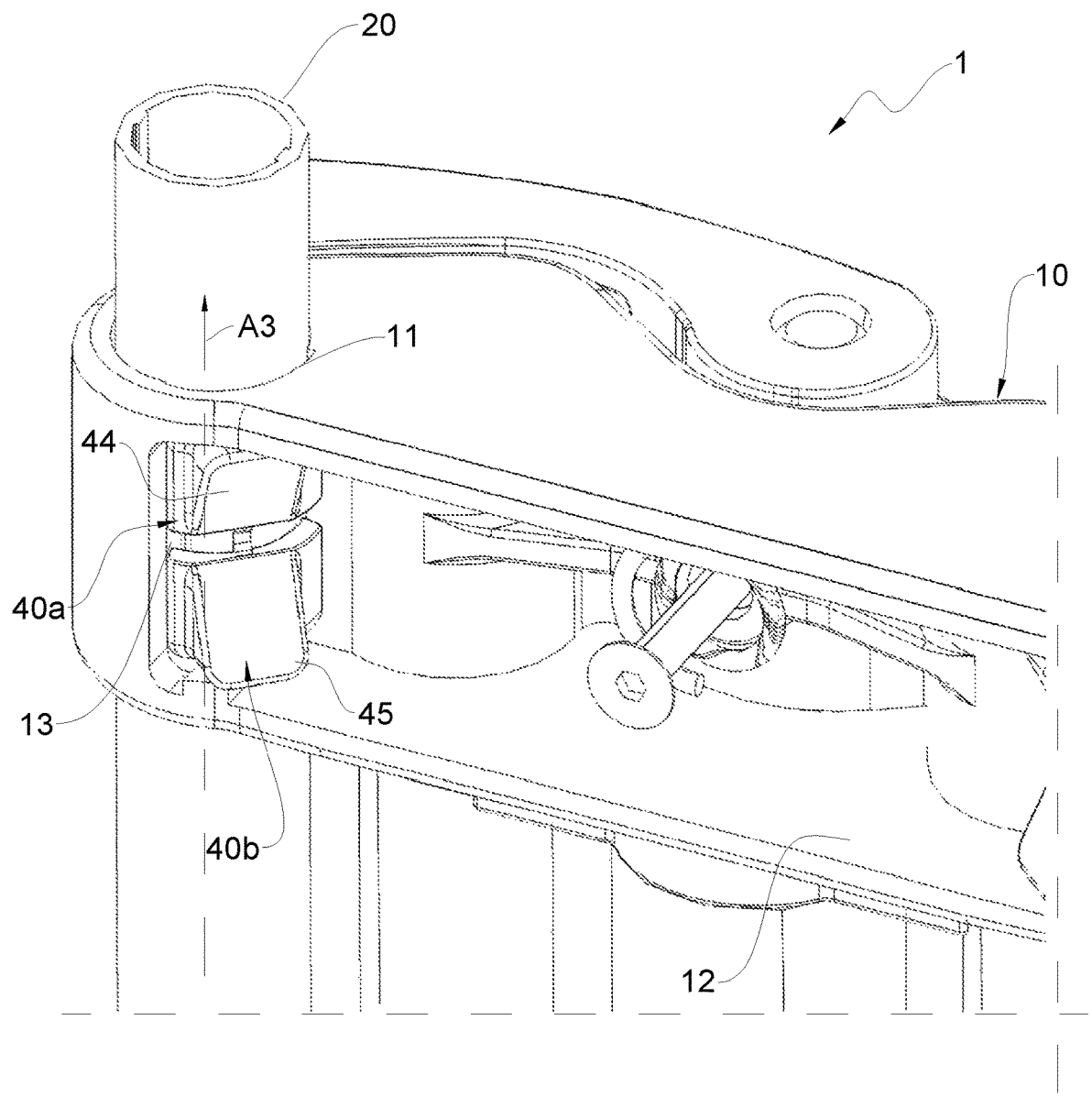
FIG. 10 is a schematic, perspective partial and detailed view of a detail of the blocking device of FIG. 5.

Preferably, with reference to FIG. 9, the device 1 comprises a first and a second runner 40a, 40b which are received in the third seat 13 and formed so as to be moved away from each other when the actuator 30 is moved towards the blocking position C2.

Figure 8:
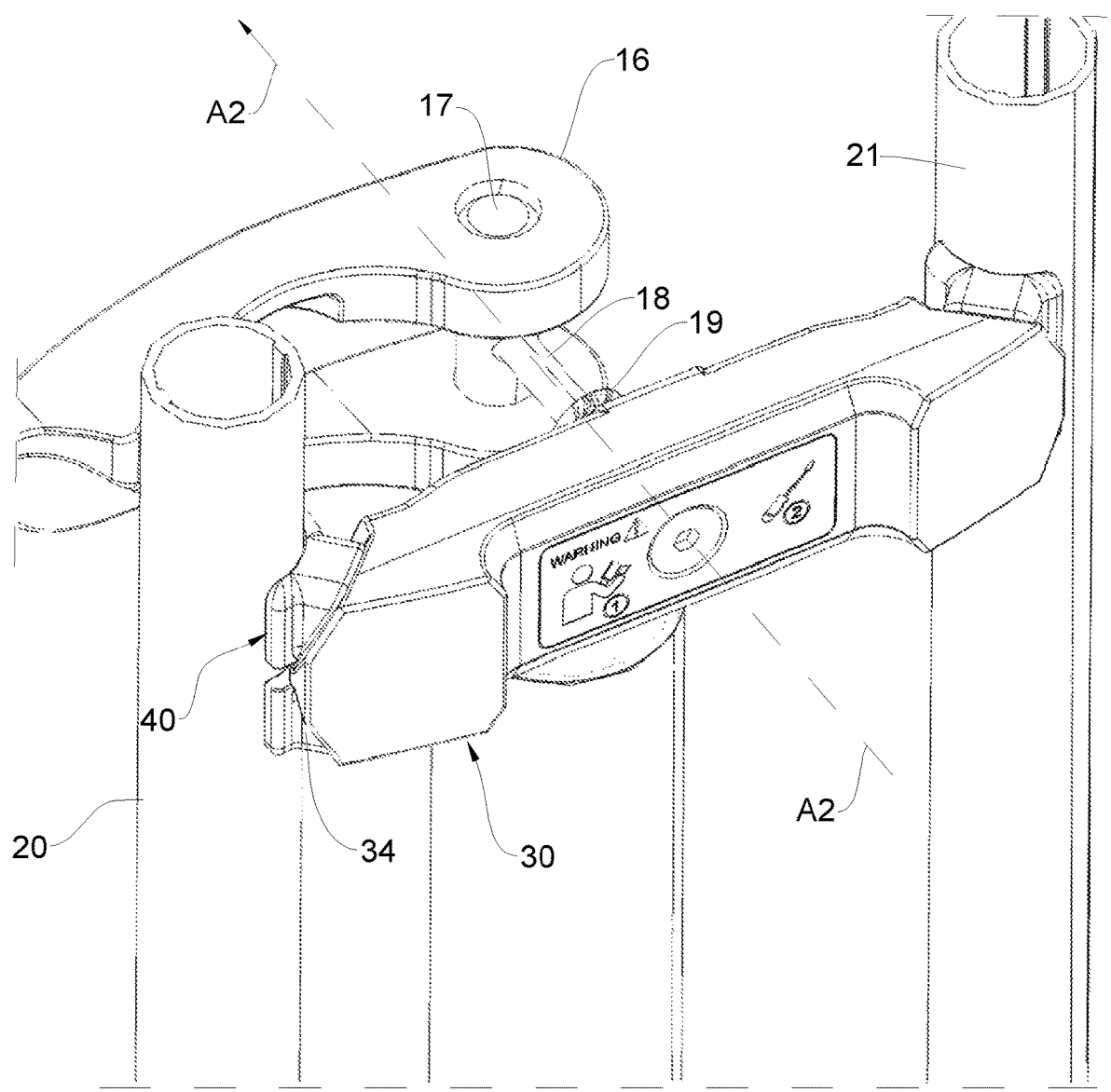
FIG. 8 is a schematic, perspective view of the device of FIG. 5 without the housing, wherein the actuator is also illustrated.

As may be noted in FIG. 9, the first and second runners 40a, 40b have corresponding first and second abutment surfaces 44, 45 which are in the form of inclined planes which are symmetrical to each other with respect to a plane of symmetry which is parallel with the transverse plane of the actuator 30 when it is inserted inside the housing 10 (see FIG. 8). In this case, this formation also allows the corresponding first and second abutment surfaces 44, 45 to be effectively complementary to the first inclined surface 34 and the second inclined surface 35 of the actuator 30 by sliding one on the other readily in accordance with the movement of the actuator 30 towards or away from each other along the sliding axis A2, respectively.

When they are inserted for the first time inside the third seat 13, the first and second runners 40a, 40b are secured to each other by a thin tongue 39 (or connection element) which is intended to break the first time that the actuator 30 is moved into the blocking position C2.

Still with reference to FIG. 9, the first and second runners 40a, 40b move along the third sliding axis A3, moving into contact with abutment portions 14 of the housing 30. In particular, these abutment portions 14 can be constituted by planar elements 14b of the actuator 30 or protrusions 14 which project from the actuator itself.

Still with reference to FIG. 9, it may be noted how the third sliding axis A3 is advantageously parallel with a longitudinal axis Z of the shaft 20.

The above-mentioned considerations are also intended to be applied to the third and fourth runners 40c, 40d which are received on the second shaft 21 in a generally similar manner.

Preferably, the actuator 30 comprises at least one protrusion 34b which is adjacent to the first inclined surface 34 and which is formed so as to act as a guide along the third sliding axis A3 for the corresponding first abutment surface 44.

With reference to FIG. 7, it may be noted how this protrusion 34b has a main development in accordance with an axis perpendicular to the transverse plane which is defined by the second sliding axis A2 and the development axis L. Preferably, the protrusion 34b has a point-like form which tapers in the direction towards the above-mentioned transvers plane.

If it is desirable to block more than one shaft at the same time, it is simply necessary for the actuator 30 to have such inclined surfaces as to be able to move simultaneously a plurality of runners which interact with respective shafts. It is important that there is at least one runner for each shaft on which it is desirable for the actuator to act, as shown in FIGS. 2 to 9.

With reference to FIG. 1, there is further identified a second blocking device 100 which is interposed between the first blocking device 1 and the support feet of the leg of the tripod.

This second blocking device 100 is substantially identical to the first blocking device 1 (with the difference that it is formed in order to act on and block a single shaft 24), so that the features described above in relation to the first blocking mechanism 1 are immediately also able to be referred to the second blocking device 100 in which the housing 10 is replaced by the housing 110, the shaft 20 is replaced by the shaft 24 which moves inside a first seat 111a along a first sliding axis A101, the actuator 30 is replaced by the actuator 130 which moves inside a second seat 112 along a second sliding axis A102 and the at least one runner 40a is replaced by the at least one runner 140a which moves inside a third seat 113 along a third sliding axis A103.

Figure 11:
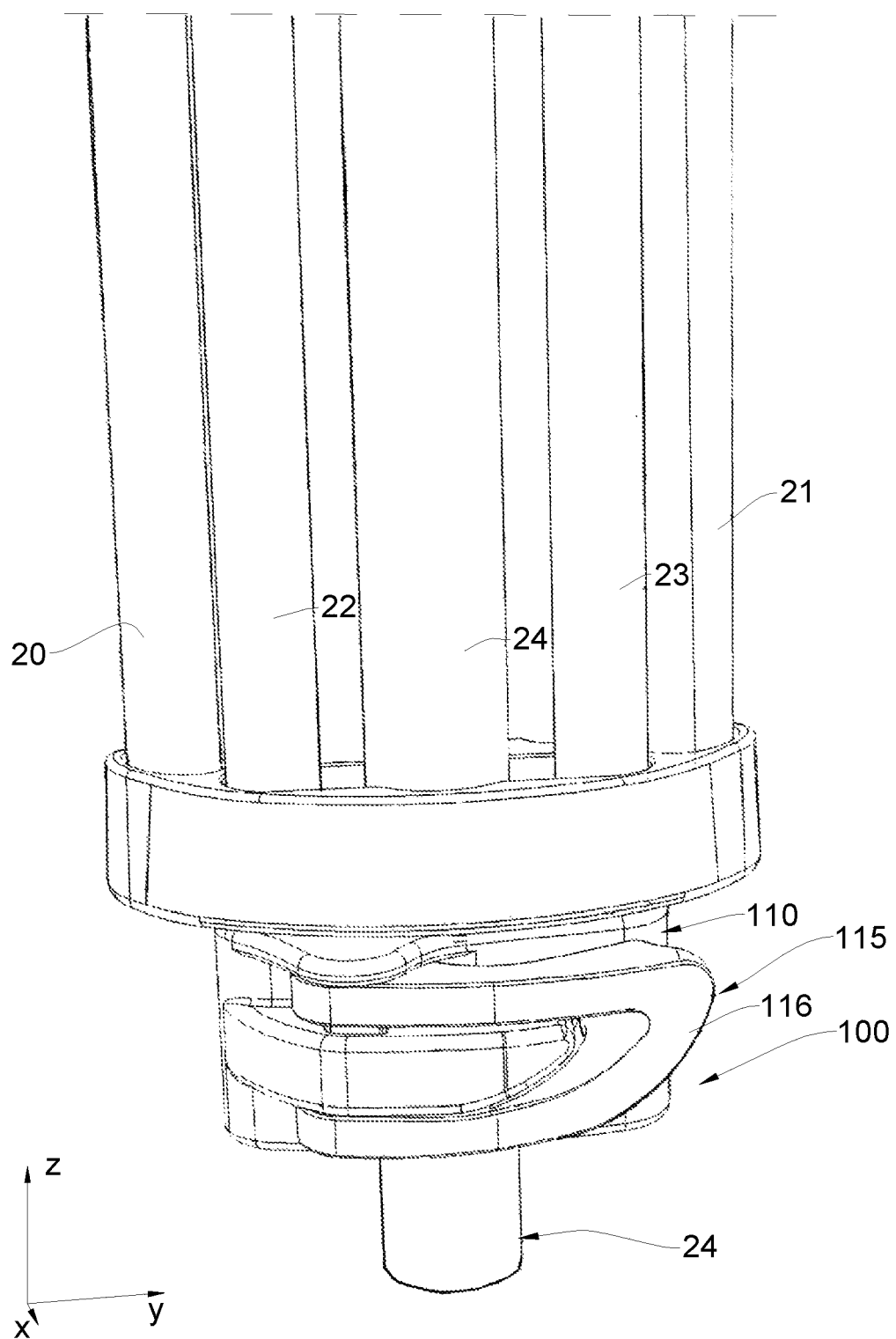
FIG. 11 is a schematic, perspective front view of a second embodiment of a blocking device for shafts constructed according to the present invention.
Figure 12:
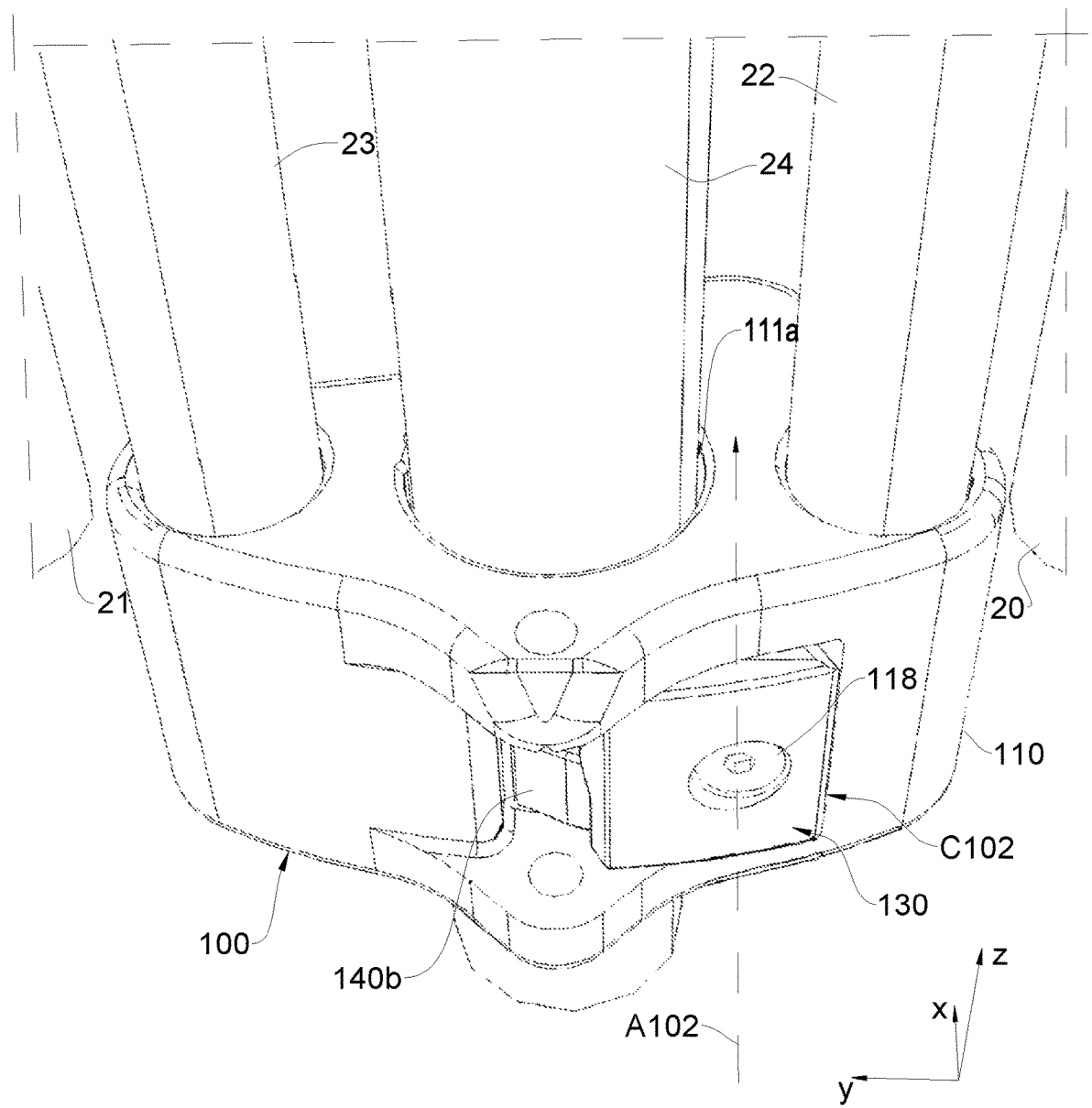
FIG. 12 is a schematic, perspective rear view of the blocking device of FIG. 11.
Figure 13:
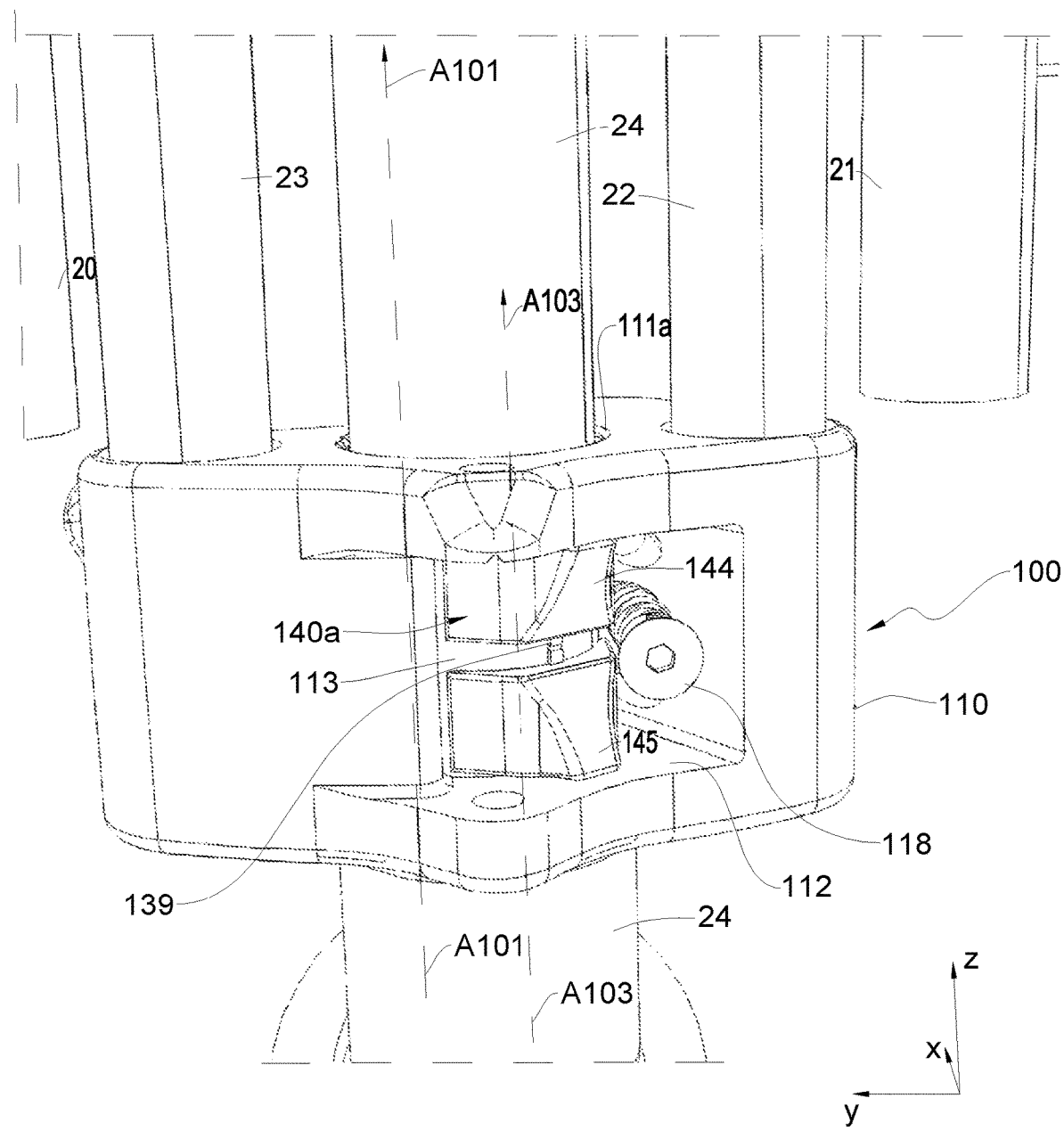
FIG. 13 is a schematic, perspective view of the device of FIG. 12, without the actuator.
Figure 14:
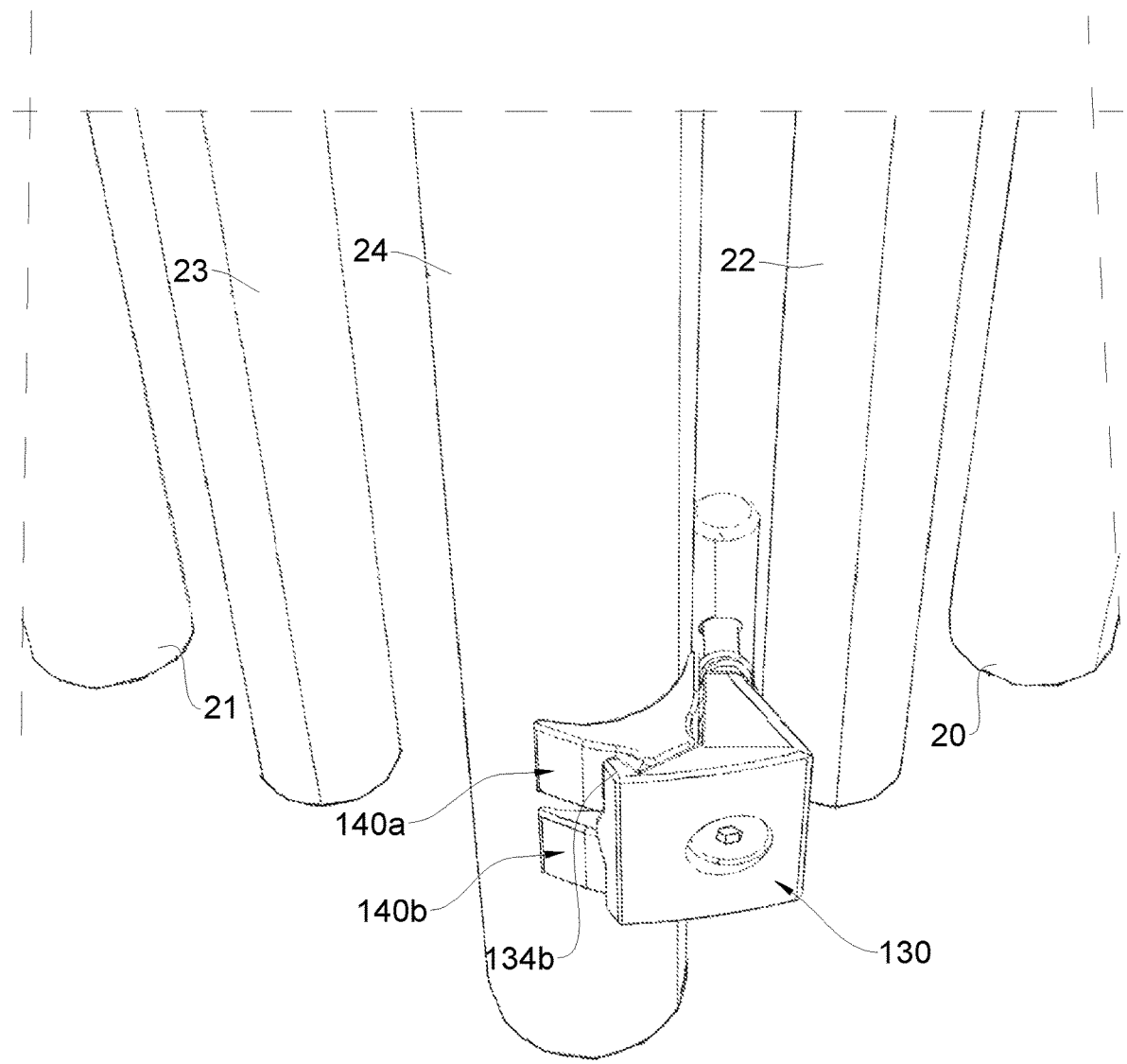
FIG. 14 is a schematic, perspective view of the device of FIG. 12, without the housing and the lever for a cam mechanism.
Figure 15:
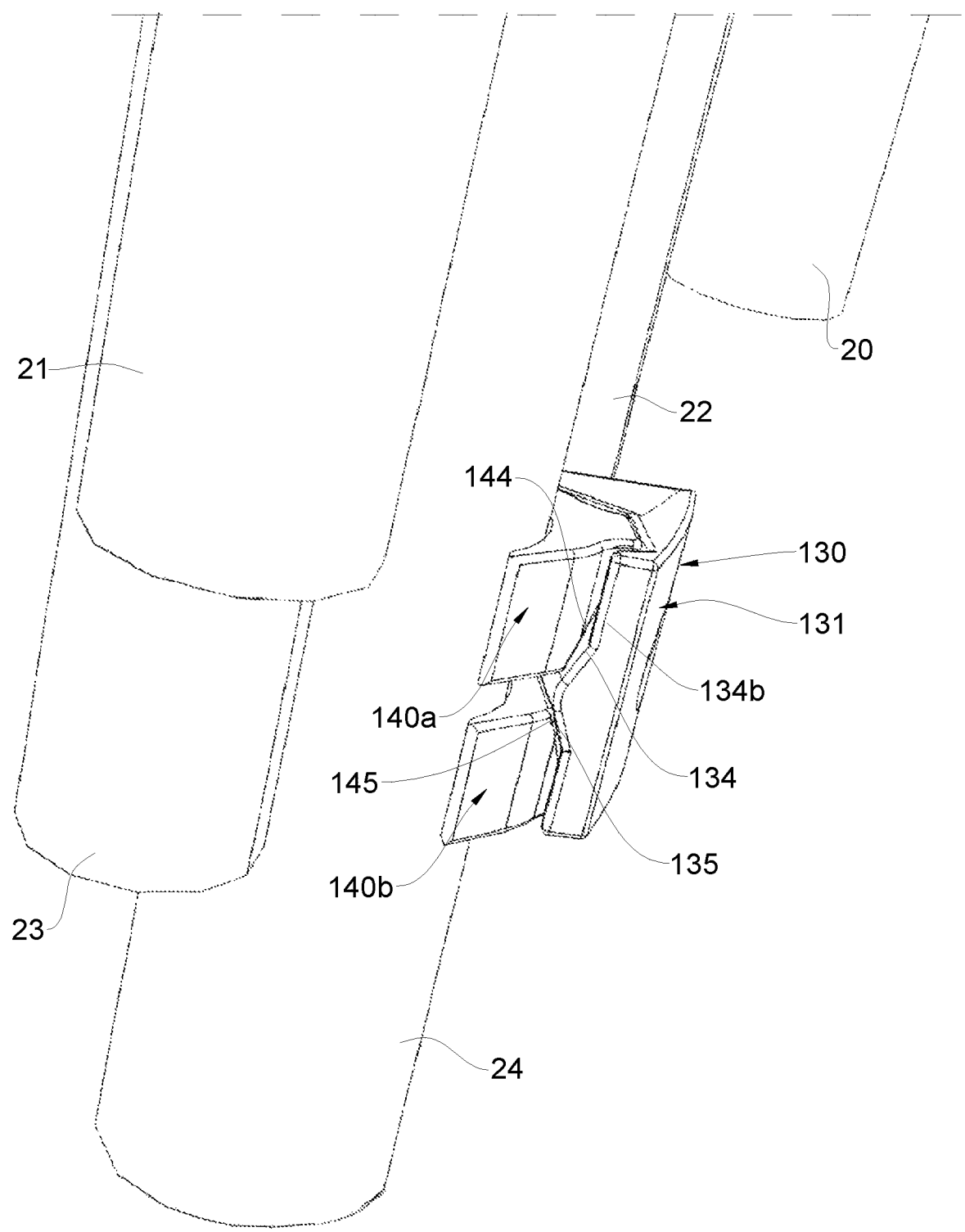
FIG. 15 is a schematic, perspective view of the device of FIG. 14.

Considering the three-axis Cartesian reference system X, Y, Z of FIGS. 11, 12 and 13, it may be noted how the first sliding axis A101 and the third sliding axis A103 are parallel with the axis Z, while the second sliding axis A102 is parallel with the axis X.

Thus, the actuator 130 of the second blocking device 100 slides along the second seat 112 by moving along the second sliding axis A102 from the sliding position, in which it is at the maximum distance from the shaft 24, to the blocking position C102, in which it is at the minimum distance from the shaft 24. In this case, when the actuator 130 moves towards the blocking position C102, it also moves the at least one runner 140a against the shaft 24 and against the housing 110 so as to block the actuator 130, the at least one runner 140a and the shaft 24 with respect to the housing 110.

FIG. 11 shows the second blocking device 100 in which the housing 110 comprises holes for the shafts 22 and 23 which are not through-holes while the central shaft 24 slides through the first seat 111a.

The actuator 130 is also moved in this case by a movement mechanism 115 comprising a cam lever 116 which is connected by means of a rod 118 to the actuator 130 itself.

The actuator 130 has a first and a second inclined surface 134 and 135, preferably having a planar development, and the first and second runners 140a, 140b have corresponding first and second inclined surfaces 144 and 145 which have a spatial development parallel with that of the first and second inclined surfaces 134 and 135.

In this case, the first and second runners 140a, 140b also have a curved basic surface having a radius of curvature which is similar to that of the shaft 24, on which they are supported.

Advantageously, the first and second runners 140a, 140b are secured to each other by a thin tongue 139 (or a connection element) which is intended to break the first time that the actuator 130 is moved into the blocking position.

Preferably, the actuator 130 comprises at least one protrusion 134b which is adjacent to the first inclined surface 134 and which is formed so as to act as a guide along the third sliding axis A103 for the corresponding first abutment surface 144.

With reference to FIG. 12, it may be noted how this protrusion 134b has a main development parallel with the first sliding axis A101. Preferably, the protrusion 134b has a narrowed point-like shape.

According to an embodiment which is included within the present invention, there is provision for a blocking system 200 which comprises a plurality of blocking devices 1; 100 at least partially having the features set out above, wherein each blocking device 1; 100 acts by unblocking or blocking a corresponding shaft 20; 24.

Again with reference to FIG. 1, the tripod-leg video-photographic equipment support illustrated comprises a first blocking device 1 which acts on two shafts 20, 21 simultaneously and a second blocking device, which is positioned in a position near the support end of the leg, which acts only on the shaft 24.

The blocking device 1 is used as follows, merely by way of non-limiting example.

The tripod-leg video-photographic equipment support is illustrated in FIG. 1 and comprises a leg which can be extended to a desired length between a retracted configuration, in which the shafts of the leg are all close together, and the leg has a minimum extent, and an extended configuration, in which the shafts are spaced apart from each other and the leg has a maximum extent.

Advantageously, a user can rotate the cam lever 116 of the second blocking device 100, thereby carrying the actuator 130 into the sliding position and allowing the free sliding of the second blocking device 100 with respect to the shaft 24. Advantageously, the shaft 24 is provided with a travel limit stop 160 which defines the maximum sliding length of the shaft 24 with respect to the second blocking device 100.

Once the desired position of the second blocking device 100 has been identified with respect to the shaft 24, the user can, by bringing the cam lever 116 into the closed position, rotate the eccentric of the lever 116, move the rod 118 which moves in turn the actuator 130 towards the pair of runners 140a, 140b, thereby blocking the sliding of the shaft 24 with respect to the actuator 130 and the housing 110 thereof.

Furthermore, if desired, the user could also carry out a modification of the length of the leg by acting on the first blocking device 1.

In this case, by disengaging the cam lever 16 from the individual seat, it allows the actuator 30 to be moved away from the shafts 20 and 21, thereby allowing the free sliding thereof inside the prepositioned seats.

Once the new position of the first blocking device 1 is defined with respect to the shafts 20, 21, the user can again block the system by counter-rotating the cam lever 16, bringing it into the individual clamping position in which the rod 18 moves the actuator 30 in the direction radially towards the shafts 20, 21 by moving the two pairs of runners 40a, 40b and 40c, 40d, moving into abutment against the housing 10 and thereby blocking the actuator 30, the shafts 20, 21, the two pairs of runners 40a, 40b and 40c, 40d and the housing 10 relative to each other.

The fixed distance between the first blocking device 1 and the second blocking device 100 is defined in a rigid manner by the length of the shafts 22, 23 which are received in provided seats or holes which are constructed in the two blocking devices.

It will be appreciated, therefore, that the video-photographic equipment supports having tripod legs comprising inventions constructed according to the present invention allow the acquisition of video-photographic exposures of a quality superior to those which can be obtained by means of the technical solutions set out in the prior art.

In fact, the presence of the at least one runner which is interposed between the actuator and the shaft allows securing thereof, when the actuator is moved into a blocking position, both in a radial direction and in accordance with at least one additional parallel or perpendicular component of the third sliding axis, significantly reducing, if not eliminating, the play present between the actuator and the housing. In this manner, it is possible to prevent possible rotations between two leg sections when they are subjected to flexion.

The present invention therefore solves the technical problem set out above with reference to the cited prior art, at the same time affording a number of other advantages.

Naturally, in order to satisfy specific and contingent application requirements, a person skilled in the art may apply to the invention described above additional modifications and variants which are still included within the scope of protection as defined by the appended claims.

The invention claimed is:
1. A blocking device (1; 100) for shafts comprising:
   a housing (10; 110) having a first seat (11a; 111a) for receiving a shaft (20; 24) movable along a first sliding axis (A1; A101),
   an actuator (30; 130) which is received in a second seat (12; 112) formed in the housing movable along a second sliding axis (A2; A102) away from and towards a blocking position (C2; C102) of the shaft (20; 24) in the first seat with respect to the housing, and first and second runners (40a, 40b;140a, 140b) which are received in the housing and which are interposed between the actuator and the shaft, wherein the actuator is formed in such a manner that, when the actuator is moved towards the blocking position (C2; C102), the actuator urges the first and second runners (40a, 40b; 140a, 140b) both against the shaft (20; 24) and against the housing (10; 110) so as to block the actuator (30; 130), the first and second runners (40a, 40b; 140a, 140b) and the shaft (20; 24) with respect to the housing (10; 110) and wherein the first and second runners (40a, 40b; 140a, 140b) are formed so as to be moved away from each other when the actuator (30; 130) is moved towards the blocking position (C2; C102).

2. The device according to claim 1, wherein the actuator (30; 130) comprises at least a first inclined surface (34; 134) with respect to the second sliding axis (A2; A102) and the first runner (40a; 140a) comprises a corresponding first abutment surface (44; 144) which is formed so as to be urged against the shaft (20; 24) and against the housing (10; 100) by the first inclined surface (34; 134) when the actuator (30; 130) is moved towards the blocking position (C2; C102).

3. The device according to claim 1, wherein the first inclined surface (34; 134) is inclined with respect to any triplet of axes which are orthogonal to each other and of which one axis is parallel with the second sliding axis (A2; A102).

4. The device according to claim 1, wherein the first and second runners (40a, 40b; 140a, 140b) are received in the housing with the capacity for movement along a third sliding axis (A3; A103) parallel with a longitudinal axis (Z) of the shaft (20; 24).

5. The device according to claim 4, wherein the actuator (30; 130) comprises at least one protrusion (34b, 134b) which is adjacent to the first inclined surface (34, 134) and which is formed so as to act as a guide of the first runner (40a; 140a) during the movement thereof along the third sliding axis (A3, A103).

6. The device according to claim 1, wherein the actuator is moved along the second sliding axis (A2, A102) by a rod (18, 118) which is connected to a cam lever (16, 116).

7. The device according to claim 1, wherein the housing (10, 110) comprises a plurality of the first seats (11a, 11b) in which a plurality of the shafts (20, slide, which can be selectively blocked by the actuator (30) and respective first and second runners (40a, 40b, 40c, 40d) provided for each shaft of the plurality of shafts.

8. A tripod for supporting video-photographic equipment comprising a plurality of shafts which can be moved relative to each other between an extended configuration and a retracted configuration and at least one blocking device for blocking the shafts in a desired position, wherein the at least one blocking device is constructed according to claim 1.

* * * * *